H. L. Andrews,

Inkstand.

No. 3634. Reissued, Sept. 7. 1869.

Witnesses
H. Gardner
E. W. Griffin

H. L. Andrews
by Joseph Ellsworth & Co
per Dodge

United States Patent Office.

HERBERT L. ANDREWS, OF CHICAGO, ILLINOIS.

*Letters Patent No.* 76,138, *dated March* 31, 1868; *reissue No.* 3,634, *dated September* 7, 1869.

IMPROVEMENT IN INKSTANDS.

The Schedule referred to in these Letters Patent and making part of the same.

*To all whom it may concern:*

Be it known that I, HERBERT L. ANDREWS, of Chicago, in the county of Cook, and State of Illinois, have invented certain new and useful Improvements in Ink-Wells; and I do hereby declare the following to be a full, clear, and exact description thereof, which will enable others skilled in the art to which my invention appertains, to make and use the same, reference being had to the accompanying drawings, forming part of this specification, in which—

Figure 1:
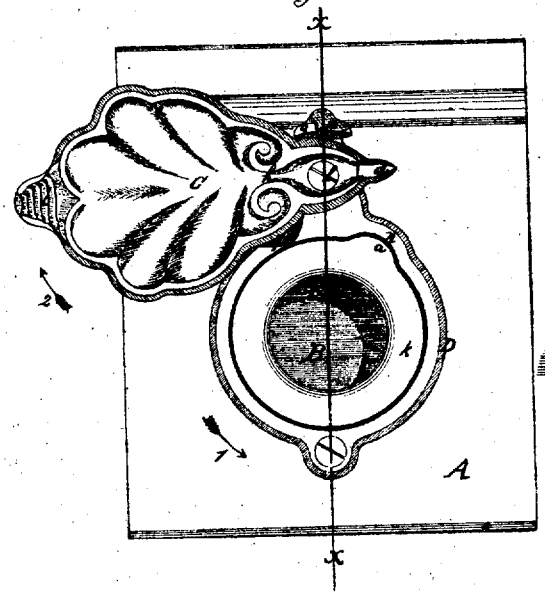
Figure 2:
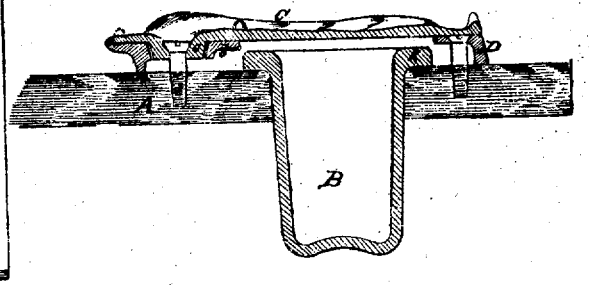
Figure 3:
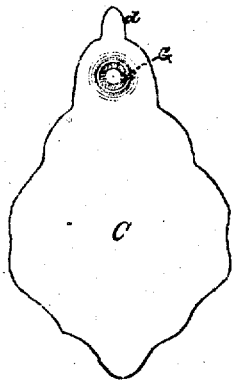

Figure 1 is a top plan view, showing a portion of a desk, with the cover of the ink-well open;

Figure 2, a longitudinal section through the line *x x*, fig. 1, the cover of the ink-well being closed; and Figure 3, an inverted plan view of the cover.

Similar letters of reference indicate corresponding parts in the several figures of the drawing.

This invention relates to ink-wells, designed principally for use in school and other desks, and It consists, first, in the combination, with an ink-reservoir let into the top of a desk, of a guard, or rim, composed of metal or other suitable material, having a laterally-swinging cover, and secured to the desk around the flange of the reservoir, whereby the latter is retained in place and protected from injury.

It consists, secondly, in providing the laterally-swinging cover of an ink-well with a raised ridge, flange, or border around its upper surface, for the purpose of forming a receptacle to hold loose pens, wafers, &c.

It consists, thirdly, in the combination of a rearward extension formed upon the cover, with an upward projecting lug upon the inner end of the rim, whereby the cover is prevented from being swung in either direction in contact with the back of the desk.

The invention consists, lastly, in providing the upper surface of the cover with a pen-rack, whereby a pen and its holder are held free from contact with the top of a desk, for the purpose of keeping the latter clean and free from ink.

In the accompanying drawings—

A represents a portion of the top of a school or other desk.

B is the reservoir for the ink, and may be made of glass or other suitable material.

As shown in fig. 1, this reservoir is provided with a flange, or rim, *k*, at the top, on which are formed one or more lateral projections, *a*.

D is a rim surrounding the flange of the reservoir, and bevelled slightly upon its inner side, next the outer edge of said flange. It is composed of cast-iron or other proper material, and provided with one or more recesses, *n*, corresponding with the projections *a* on the reservoir.

The rim is secured in place by means of screws *l m* around the opening formed in the top of the desk for the reception of the reservoir, whose flange *k* rests upon the upper surface of the desk, and is surrounded by the guard. In this position the reservoir can be turned partially round, to bring its lateral projection *a* beneath that portion of the guard not recessed. From this position it cannot be removed without being turned from the under surface of the desk, until its projection *a* coincides with the recess *n* in the guard.

At *b* the rim is countersunk, to receive a corresponding projection, *c*, upon the under side of the cover C, which, with the screw *l*, forms the joint for said cover.

*g* is an upward-projecting lug, formed upon one side of the rear extension *e* of the rim, and

*d* is a point, or projection formed upon the inner end of the cover.

The lug *g* and point *d* are so arranged with relation to each other, that the latter will be brought in contact with the former when the cover is closed, thereby preventing the further movement of the cover in the direction of the arrow 1.

When the cover is swung open, its side will come in contact with the lug *g*, as shown in fig. 1, and its further movement in the direction of the arrow 2 arrested.

By this arrangement, the cover is at all times prevented from striking against the back of the desk.

The projections *e* and *g* furnish a suitable place for attaching a pen-wiper, by means of a rubber band first secured to the wiper, or in any other convenient manner. For this purpose, also, a small hole may be made in the projection *e*, or a ring may be attached thereto.

The cover C is composed of metal, and corresponds in size to the rim D. It is provided upon its upper surface, at opposite ends, with indentations *h* and *i*, in line with each other, and adapted to receive a pen-holder, when the cover is either open or closed, in such a manner as to prevent the ink upon the pen from coming in contact with the desk.

The bottom or hole of the indentation *i* is corrugated, as shown, to be used as a pencil-sharpener. These file-like corrugations may be arranged on one side of the guard D, if desired.

The cover C is hollowed out or made concave in any suitable manner, to form a receptacle for pens, wafers, &c. It may also be so formed and adjusted, that when open the point *p* will project over the edge of the reservoir, thus rendering it impossible to remove the latter without first removing the cover. This arrangement will be found of great advantage when the flange of the reservoir is unprovided with the lateral projection.

The screw *l* passes through both the cover C and rim D, securing the latter to the desk, and forming a pivot for the former.

If desired, the rim D may be constructed without the recess *n*, and the usual form of reservoir (without the projection *a*) employed. In this case, the bevelled inner side of the rim rests against the outer edge of the flange of the reservoir, and holds the latter securely in position.

My improved ink-well is simple and cheap in construction, and supplies a want long felt in the market.

I am aware that a guard has been used extending over the entire flange of the reservoir, and over a portion of the opening in the reservoir; but this is objectionable, for the reason that easy access to the reservoir cannot be obtained.

Having thus described my invention,

What I claim as new, and desire to secure by Letters Patent, is—

1. The rim D, surrounding the flange of the reservoir, and having the inner bevelled side, and the laterally-swinging cover C, and either with or without the recesses or indentations *n*, in combination with the reservoir B, either with or without the lateral projections *a*, substantially as herein described, for the purpose specified.

2. The cover C of an ink-well, made concave or recessed upon its upper surface, to form a receptacle for pens, wafers, &c., substantially as herein shown and described.

3. The combination of the rearward extension *d*, formed upon the cover C, with the lug *g* formed upon the inner end *e* of the guard D, arranged as herein shown and described, for the purpose specified.

4. The laterally-swinging cover of an ink-well, provided upon its upper surface with a pen-rack, substantially as described, for the purpose specified.

The above specification of my invention signed by me, this day of August, 1869.

H. L. ANDREWS.

Witnesses:
A. BERNSTEIN,
JOHN A. SILENCE.